Nov. 4, 1958

F. D. GRISWOLD 2,858,912

COMBINED WHEEL AND DISC BRAKE ASSEMBLY AND
ACTUATOR MEANS THEREFOR

Original Filed Dec. 8, 1955

Inventor
F. D. Griswold
By Robb & Robb
Attorneys

Nov. 4, 1958  F. D. GRISWOLD  2,858,912
COMBINED WHEEL AND DISC BRAKE ASSEMBLY AND
ACTUATOR MEANS THEREFOR
Original Filed Dec. 8, 1955  5 Sheets-Sheet 4

Inventor
F. D. Griswold
By Robb & Robb
Attorneys

Nov. 4, 1958

F. D. GRISWOLD 2,858,912

COMBINED WHEEL AND DISC BRAKE ASSEMBLY AND ACTUATOR MEANS THEREFOR

Original Filed Dec. 8, 1955

5 Sheets—Sheet 5

United States Patent Office 2,858,912
Patented Nov. 4, 1958

2,858,912

COMBINED WHEEL AND DISC BRAKE ASSEMBLY AND ACTUATOR MEANS THEREFOR

Frederick Daniel Griswold, St. Joseph, Mich., assignor, by mesne assignments, to Lambert Brake Corporation, St. Joseph, Mich., a corporation of Michigan Original application December 8, 1955, Serial No. 551,759. Divided and this application May 16, 1957, Serial No. 659,699

5 Claims. (Cl. 188—196)

This application is a division of application Serial Number 551,759, filed December 8, 1955.

The present invention relates to friction devices, and more particularly to an improved friction device which constitutes means for rotatably journalling a relatively rotatable member such as a vehicle wheel or other rotary element and for transmitting torque to or from the rotatable member, said friction device having novel operating means for effecting automatic adjustment of the friction device coincident with actuation of the friction device.

An object of the invention is to provide a multiple disc brake having a stationary disc or plate assembly adapted to be connected to a rigid support such as an airplane landing gear strut, said disc or plate assembly having a rotary element such as an airplane wheel mounted thereon, with bearings disposed between the disc or plate assembly and the rotary element, thus obviating the need for a separate axle for the rotary element or wheel. Disposed between the rotary member and the stationary disc or plate assembly is a number of interleaved discs, including at least one friction disc connected to the rotary member for rotation therewith and an actuator disc carried by the stationary disc or plate assembly and operative to effect engagement of the interleaved discs with attendant absorption of torque from said rotary element by said disc or plate assembly.

Another object of the invention is to provide novel actuator means for effecting operation of the actuator disc aforesaid, while at the same time automatically compensating for wear of the discs by limiting release movements of the actuator disc to a uniform and only relatively slight movement as may be necessary to provide a constant release clearance between the discs throughout the life of the friction surfaces of the friction device.

A further object is to provide fluid pressure-operated actuator means as aforesaid, including an actuator cylinder having a piston chamber therein, a piston reciprocably disposed in said piston chamber, and self-adjuster means disposed in said piston chamber and operative responsive to shifting movements of said piston to automatically adjust and limit movements of said piston in a brake-release direction. In such a structure, distinct advantages accrue to the self-adjuster means, particularly in a hydraulically operated actuator, by reason of the fact that the adjuster means are bathed in the hydraulic fluid and thereby continuously lubricated, with attendant long life and ease of operation of the adjuster means.

Specifically, in connection with the actuator means hereof, it is an object to provide a fluid pressure-operated actuator device including a body having a piston chamber therein, a piston reciprocably disposed in the piston chamber and adapted to be operatively engaged with a member to be operated, said body having an adjuster screw threadedly connected thereto, and said screw and piston being cooperatively interengaged for permitting said piston to shift freely in one direction, but limiting return movement of said piston. In such a structure, the adjuster screw is preferably provided with an enlarged head disposed in an opening in said piston and having a head surface of substantial area engageable with a complemental area at the base of the opening in said piston, whereby when the surfaces are engaged, substantial resistance to turning of the screw relative to the piston is produced, and the piston is limited in its movement in one direction by said screw. On the other hand, in order to enable movement of the piston in the other direction, without appreciable resistance, the piston is provided with a thrust element extending beneath the screw head, and anti-friction means are disposed between said thrust element and the screw head, whereby when the piston is shifted in the last-mentioned direction, thrust will be imparted to the screw causing the screw to rotate in its threaded mounting and move axially along with the piston. Thus, a self-adjusting fluid pressure-operated actuator device is provided which has utility in brakes as hereinafter specifically described, as well as in other friction devices, and in any installation wherein automatic adjustment of return movements of an actuator piston is desired or required.

Still another object is to provide a combined wheel and brake assembly wherein the wheel is journalled upon the brake instrumentalities which are in turn secured to a fixed support, such as an airplane landing gear strut, whereby, for the purposes of rapid service, the entire assembly, including the wheel and brake instrumentalities, may be readily removed from the stationary support as a unit, and a similar unit remounted upon the strut or other stationary support in a very short period of time and with a minimum of work.

Other objects and advantages will be hereinafter described or will become apparent to those skilled in the art, and the novel features of the invention will be defined in the appended claims.

In the drawings:

Fig. 2 is a view partly in section and partly in elevation, as taken on the line 2—2 of Fig. 1, showing the brake with the wheel removed;

Like reference characters of the several figures of the drawings and in the following description designate corresponding parts.

Figure 1:
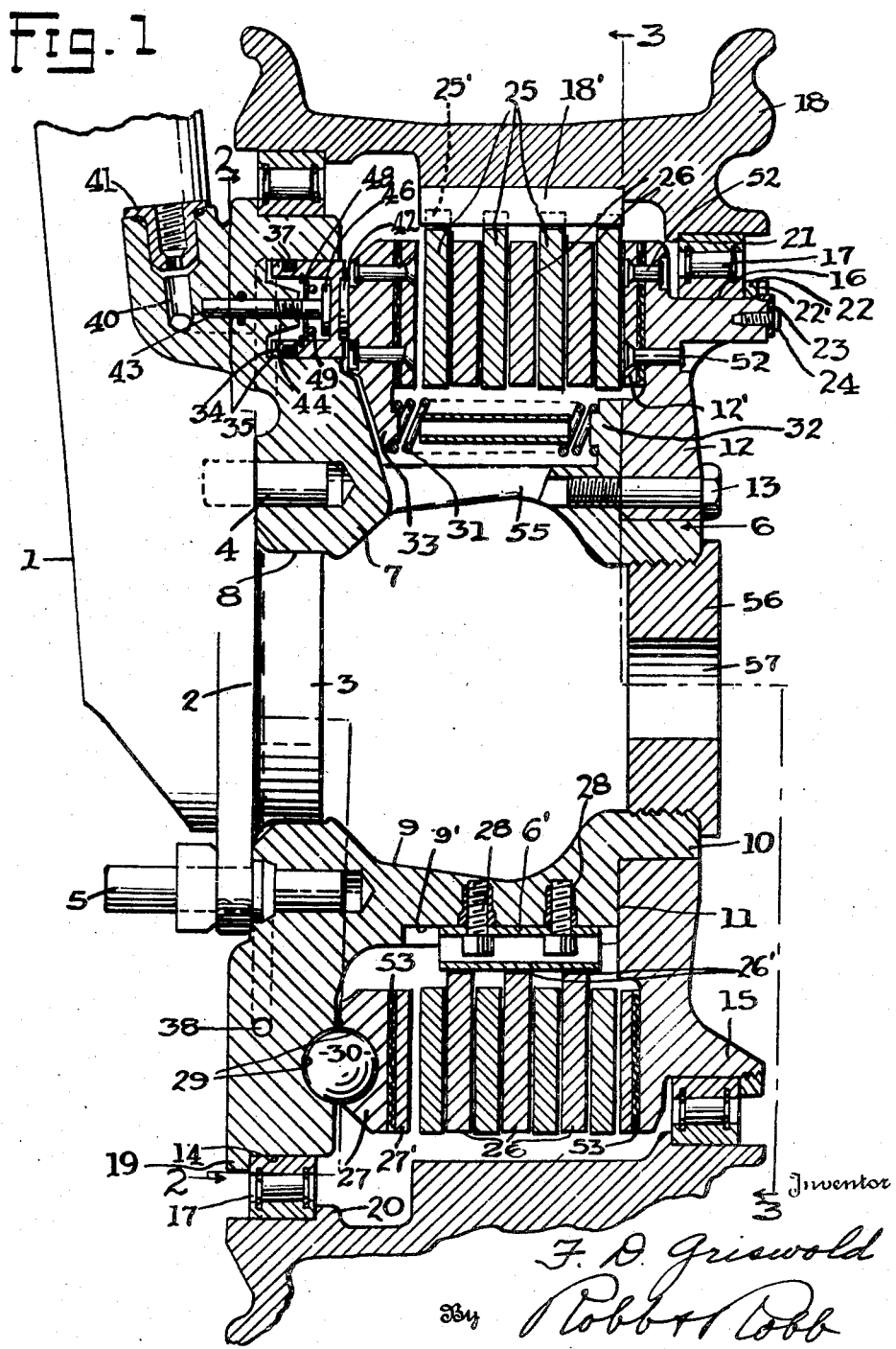
Fig. 1 is a view in section taken axially through a combined wheel and brake according to the invention, and showing the self-adjusting fluid pressure-operated actuator hereof, with certain of the parts shown in elevation.
Figure 3:
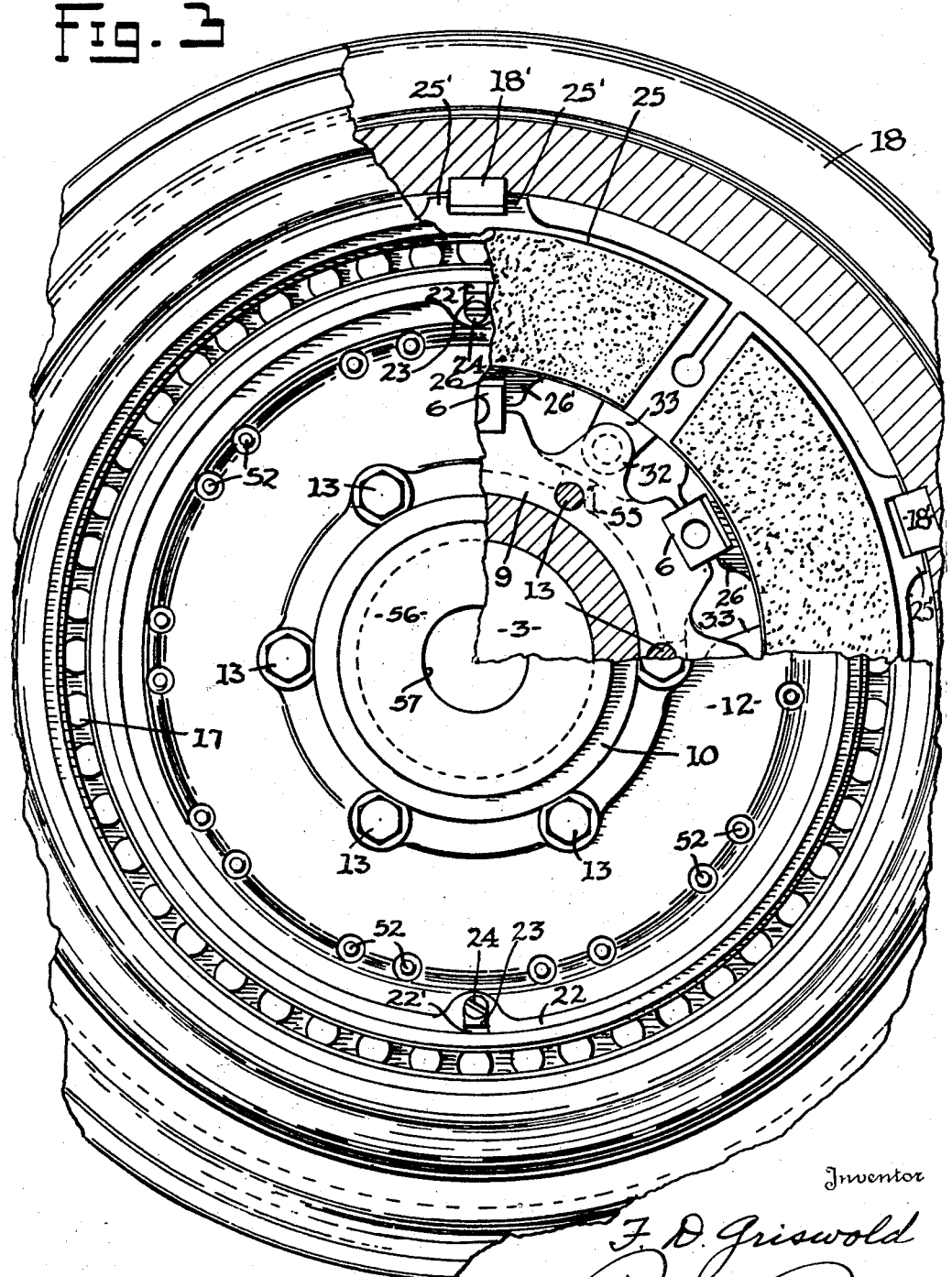
Fig. 3 is a view partly in elevation and partly in section, as taken on the line 3—3 of Fig. 1.

For illustrative purposes, a stationary support in the form of an airplane landing gear strut 1 is shown in Fig. 1, said strut 1 being formed with an enlarged supporting head 2 having a slightly axially extended stub shaft or cylindrical support 3 projecting therefrom. Centered on the stub shaft 3 and fixedly secured to the strut 1 as by means of a suitable number of pins 4 and studs 5 is a stationary disc or plate assembly generally designated 6, said assembly comprising a power plate 7 of generally annular formation having a central opening 8 therein for close-fitting engagement about the stub shaft 3. Integrally formed on the power plate 7 and extending axially therefrom is a central hub portion 9 having an axially extended supporting flange 10 at its free end. The hub 9 is also provided with a radially extended shoulder 11 adjacent to the flange 10, and a secondary disc or plate 12 of generally annular formation is disposed about the flange 10 in close engagement therewith and rigidly secured in abutting engagement with the shoulder 11 as by means of a suitable number of circumferentially spaced screws 13 which project through the secondary disc or plate 12 and into appropriately threaded openings in the hub 9.

The outer periphery of the power plate 7 is formed with an annular bearing seat 14, and the outboard side of the secondary disc or plate 12 is provided with an axially projecting flange 15 on which is formed another bearing seat 16. A pair of anti-friction bearings 17, 17 are mounted upon the bearing seats 14 and 16 and have journalled thereon a wheel 18, with the wheel and bearings retained against axial displacement by suitable retainer means. In the illustrative embodiment such retainer means includes a shoulder 19 on power plate 7 and another shoulder 20 extending inwardly from the wheel 18, with said shoulders 19 and 20 disposed at the respective opposite sides of one of the bearings 17. A further shoulder 21 is preferably formed on the inner periphery of the wheel 18 and is disposed at the inboard side of the other bearing 17 in opposed relation to a threaded retainer ring 22 which is threadedly mounted on the outer periphery of the flange 15 on secondary disc or plate 12. The retainer ring 22 is secured in position as by means of a tanged lock element 23 which is secured at the outboard extremity of the flange 15 by means of a screw 24 or the like, and which projects into a slot 22' in the ring 22.

Thus, it will be noted that the wheel is journalled upon the stationary disc or plate assembly 6, instead of upon an axle as is conventionally done.

Means are provided for selectively establishing or interrupting the transmission of torque from the wheel 18 to the stationary disc or plate assembly 6, said means including a plurality of interleaved discs preferably comprising a plurality of rotors 25 which are keyed to the inner periphery of the wheel 18, a plurality of stators 26 which are keyed to the stationary disc or plate assembly 6, and a primary actuator disc or plate 27 which is disposed between the pack of alternate stators and rotors and the power plate 7. While a plurality of rotors 25 and stators 26 have been shown in the illustrative embodiment, it should be understood that a single rotor may be utilized, or any desired number of such rotors may be utilized, accompanied by one stator between each pair of rotors, as is customary in friction devices of this general type.

The rotors 25 are preferably keyed to the inner periphery of the wheel 18 as by means of a plurality of lugs or keys 18' disposed in spaced relation about the inner periphery of the wheel, with the respective rotors 25 being provided with a pair of ears 25' projecting radially outwardly therefrom at opposite sides of each of the lugs 18'; and the stators 26 are respectively keyed to the stationary disc or plate assembly 6 by means of a suitable number of keys 6' which are fixedly secured in suitably formed grooves 9' in the hub 9 previously referred to by a pair of screws 28, with each stator 26 being provided with a pair of radially projecting ears 26' on its inner periphery disposed at respective opposite sides of the keys 6'.

The primary actuator disc 27 is operatively disposed between the secondary disc or plate 12 and the power plate 7, with the interleaved stators and rotors previously referred to interposed between the primary and secondary plates. In this connection, the opposing faces of the power plate 7 and the primary disc 27 are provided with a plurality of circumferentially spaced, opposed and oppositely inclined ramped seats 29, 29, in each opposed pair of which there is disposed a camming ball 30. The primary disc 27 is centralized and supported upon the balls 30 responsive to the action of a plurality of circumferentially spaced brake release springs 31 which are interposed between the primary disc 27 and a corresponding number of spring seats 32 which are formed on the hub 9 adjacent its free end and project radially outwardly therefrom, with each spring 31 engaged at one end on a spring seat 32 and placed under compression by a spring seat 33 projecting radially inwardly from the inner periphery of the primary disc 27. Thus, the springs 31 maintain a constant pressure on the primary disc 27 tending to shift the same axially towards the power plate 7, with the result that the balls 30 will be normally maintained in the deepest parts of the ramped seats 29, 29, and the primary disc 27 will be floatingly supported upon the balls 30 for axial shifting movements, as well as for rotative movements, whereby initial actuation and a powerful self-energizing action, respectively, are effected.

In order to effect initial actuation of the brake, a plurality of fluid pressure-operated actuator devices are disposed in equi-distantly spaced relation adjacent to the outer periphery of the power plate 8, each actuator device comprising a piston chamber 34 formed in the outboard side of the power plate 7. Each piston chamber 34 is adapted to receive and has reciprocably mounted therein an actuator piston 35, said pistons each having about its outer periphery a seal-receiving groove 36 in which is disposed an O-ring seal 37. During casting of the power plate 7, it is preferably provided with cored passageway 38 which establishes fluid communication between the respective piston chambers 34, this passageway 38 also communicating with a fluid inlet-outlet port 39 and a bleed port 40. The inlet-outlet port 39 is adapted by means of a fitting 41 to be connected with a source of fluid under pressure (not shown). Thus, when fluid under pressure is admitted to the passageway 38 through the inlet-outlet passageway 39, the fluid will be distributed to each of the piston chambers 34 and will shift the respective pistons 35 axially and outwardly of the piston chambers 34 and shift the primary discs 27 towards the secondary disc or plate 12, thereby gripping the interleaved stators and rotors between the primary and secondary discs to effect engagement of the brake.

Upon initial engagement of the brake, the rotor 25 which is engaged by the primary disc 27 will impart drag torque to the primary disc 27 tending to cause the latter to rotate along with said rotor 25, whereupon a slight relative rotation of the primary disc 27 with respect to the power plate 7 will be effected, resulting in a camming action of the balls 30 in the opposed seats 29, 29, thus instigating a powerful self-energization of the brake in proportion to the load thereon.

In view of the fact that such self-energization of the brake depends upon rotation of the primary disc 27 slightly with respect to the power plate and therefore with respect to the pistons 35, an insert 42 having a low coefficient of friction is preferably disposed in a recess in the outer end of each piston 35 for engagement with the contiguous face of the primary disc 27, whereby frictional resistance to such rotation of the primary disc 27 is minimized.

In view of the foregoing, it is apparent that a highly practical combined brake and wheel assembly is provided, wherein the wheel 18 is journalled upon bearings which are carried by the brake itself, and no axle is required for the wheel as is ordinarily the case. In addition, by merely disconnecting the brake from its source of fluid pressure at the fitting 41 and unfastening the connection of the stationary disc or plate assembly 6 to the supporting head 2 of the strut 1, the entire wheel and brake assembly may be readily removed from the strut with a minimum of effort, and a corresponding new or rebuilt assembly may be expeditiously remounted upon the strut 1 in an equally facile manner, thus enabling very rapid service of aircraft equipped with such a combined wheel and brake assembly.

In accordance with another of the salient features of the invention, means are provided for effecting automatic or self-adjustment of the actuator devices by limiting inward movement of the pistons in the piston chambers to compensate for wear of the friction discs. Such automatic or self-adjuster means includes a one-way shiftable member preferably in the form of an adjuster screw 43.

Figure 4:
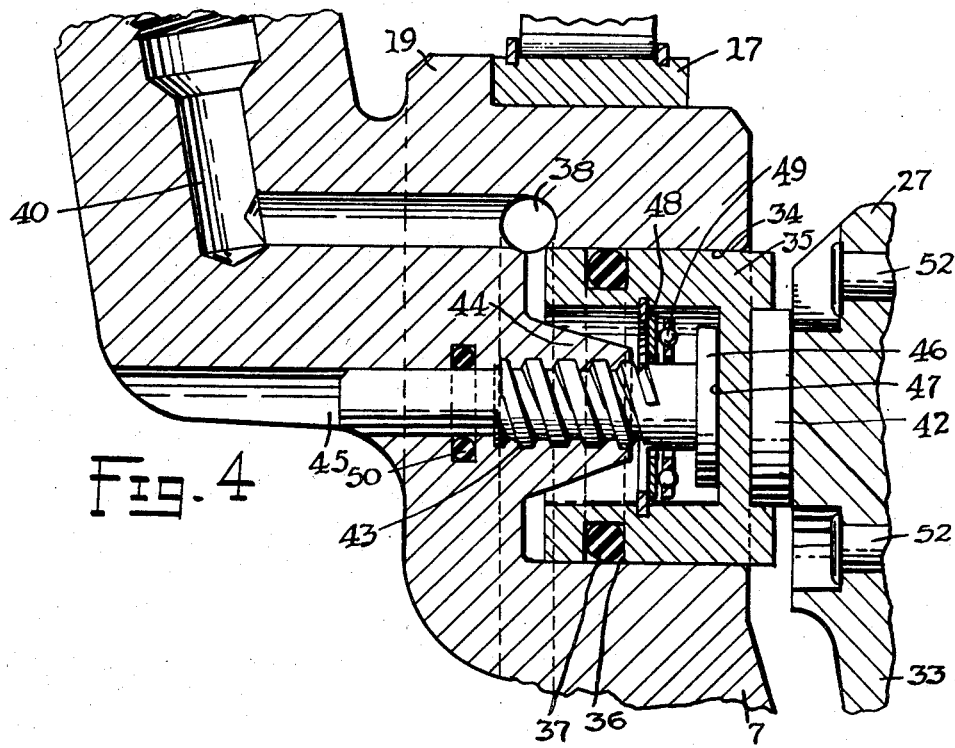
Fig. 4 is an enlarged fragmentary view in section, as taken on the line 4—4 of Fig. 2, particularly showing the self-adjusting actuator hereof.
Figures 5, 6:
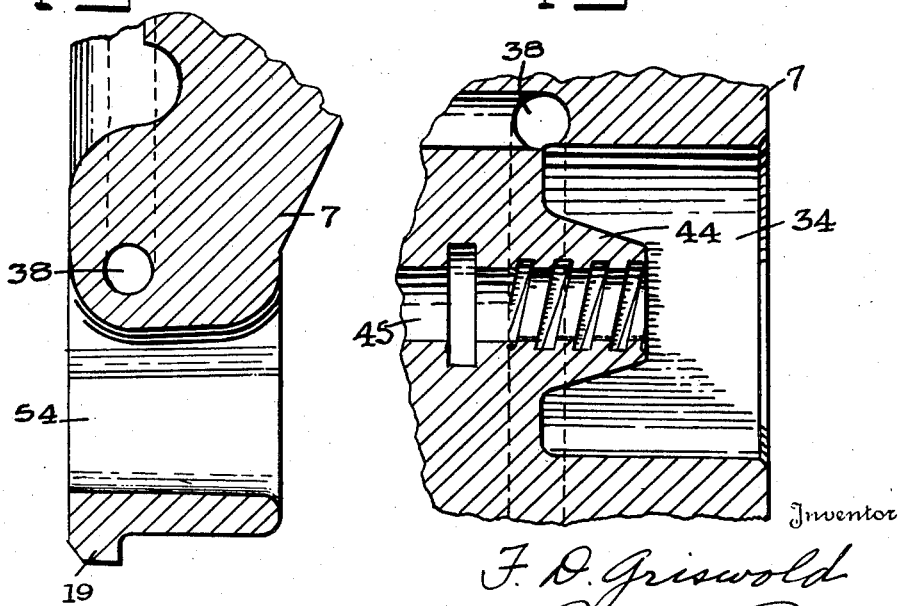
Fig. 5 is an enlarged fragmentary view in section, particularly showing one of the actuator piston chambers and adjuster screw supports.
Fig. 6 is an enlarged fragmentary view in section, as taken on the line 6—6 of Fig. 2, and showing the formation of the operating fluid conduit and one of the cooling air openings through the power plate.
Figure 7:
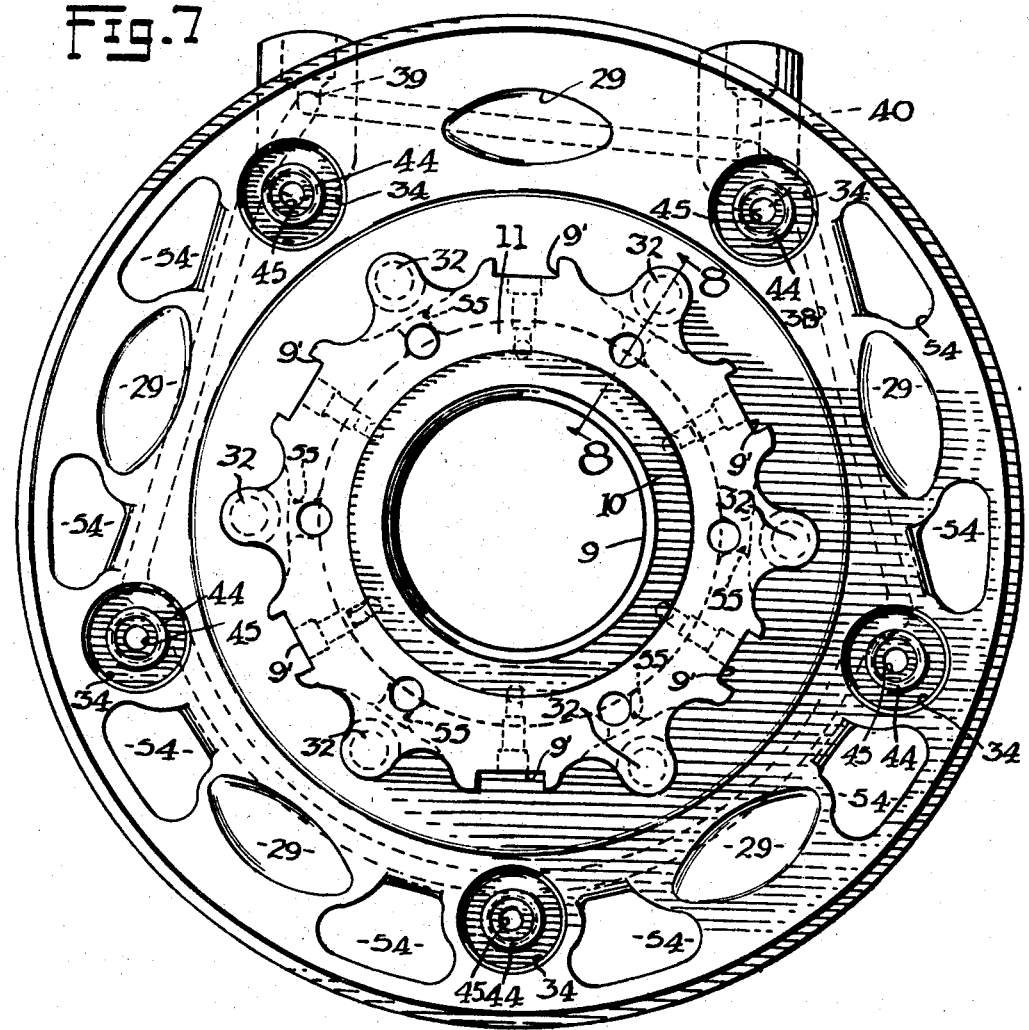
Fig. 7 is a detail view of the power plate in elevation as viewed from the outboard side.
Figure 8:
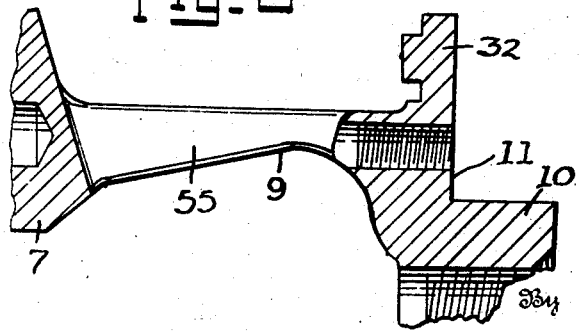
Fig. 8 is an enlarged fragmentary view in section, as taken on the line 8—8 of Fig. 7.

Integrally formed with the backing or power plate 7 in each piston chamber 34 is an axially extended boss or internally threaded screw support 44 through which the screw 43 extends and in which said screw is threadedly supported, with the lead end of said screw projecting through an opening 45 in the power plate 7 externally of the power plate, and the other end of said adjuster screw 43 being provided with a head 46 having a relatively flat face 47 disposed for engagement with a complemental face interiorly of the respective pistons 35. The head 46 of each screw is extended radially so as to overlie a snap ring 48 which is mounted about the inner peripheries of the hollow pistons 35, and antifriction means preferably in the form of a ball bearing or the like is interposed between the snap ring and the screw head. The screw 43 and its threaded mounting of each adjuster is preferably provided with a high-pitch, multiple lead thread which is so constructed as to permit the screw to be easily rotated in response to axial thrust imposed thereon beneath the screw head 46 by the bearing 49, so that the piston 35 of each actuator device will be free to shift axially in a brake-engaging direction to the full extent necessary to effect full engagement and to take up any wear. However, the bearing 49 of each adjuster is so proportioned as to allow a slight axial clearance space between the bearing and the underside of the screw head, so that the piston 35 of each actuator will be free for axial movement in a brake-engaging direction without effecting any axial force on the screw, thus to take up the required release clearance of the brake, as is represented by the exaggerated space between the primary disc 27 and the adjacent rotor 25 and by the gap between the bearing 49 and the under side of the screw head 46, as particularly shown in Fig. 4. Therefore, it will be noted that the adjuster is operative to take up wear of the friction faces of the brake, and the brake will always be provided with a substantially constant release clearance. Return movements of the pistons 35 in their respective piston chambers 34 beyond the distance required to provide the aforementioned release clearance is precluded upon abutment of the face 47 of the end wall of the respective pistons 35 with the respective adjuster screw heads 46. The substantial areas of frictional engagement between each screw head 46 and piston face 47 effectively resists retrograde rotation of the screws.

Means are also provided for preventing the leakage of operating fluid past the respective adjuster screws 43 through their threaded supports 44. Preferably, such means is in the form of an O-ring seal 50 which is disposed in an appropriate recess in the power plate 7 extending about the periphery of the opening 45 through which the adjuster screw of each adjuster extends, said O-ring seals engaging the respective adjuster screws 43 adjacent their lead end to prevent such leakage. In addition, it has been found that a further desired and improved result is accomplished by said O-ring seals 50 by virtue of the fact that they eliminate the need for any further means for preventing overrun of the adjuster screws during brake operation. Sufficient frictional engagement of the O-rings 50 with their respective adjuster screws 43 resists free rotation of the adjuster screws to the extent necessary to prevent overrunning, whereas in previous screw adjusters of a known type, it was necessary or desirable to provide special means for eliminating such overrunning.

In operation of the brake described in the foregoing, fluid under pressure will be admitted to the passageway 38 from a suitable source (not shown) and distributed to the respective fluid pressure-operated actuator devices in the power plate 7. The initial application of fluid pressure to each actuator device will cause the respective pistons 35 to move axially outwardly of their piston chambers 34, thus shifting the primary disc 27 axially towards the secondary disc or plate 12 against the brake-release pressure of the springs 31. Upon initial frictional engagement of the interleaved friction discs, including the primary disc 27 and the rotors and stators 25 and 26, respectively, as they are pressed axially towards the secondary disc or plate 12, drag torque of the rotor 25 which is engaged with the primary disc 27 will effect slight rotation of the latter disc relative to the stationary power plate 7, with the result that the balls 30 will cam the power plate 7 and primary disc 27 axially apart to engage the brake with a powerful servo or self-energizing action. Any wear of the friction surfaces will be compensated for so that a constant release clearance is maintained as the respective adjuster screws 43 in each actuator are caused to shift axially along with the actuator pistons 35 a distance equal to the wear to be compensated for, but are prevented from retrograde movement by virtue of resistance to opposite rotation of said screws as caused by the engagement of the screw heads with the end walls of the pistons 35.

Substantial heat is usually generated during brake operation, and in order to prevent the conduction of heat from the friction discs to the fluid in the actuator devices, the primary disc 27 and the secondary disc or plate 12 are each preferably provided with friction facing members as at 27' and 12', respectively, such facing members being secured to the respective discs as by rivets 52, but with an intervening layer of insulating material as at 53. On the other hand, it will be noted that the power plate 7 is provided with a plurality of circumferentially spaced openings 54 therethrough, whereby cooling air is free to circulate through the openings 54 into the area of the friction discs.

In addition, the hub 9 of the stationary disc or plate assembly 6 is provided with a plurality of circumferentially spaced openings 55 through which air is free to pass, and the secondary disc or plate 12 is provided at its central portion with a reinforcing or supporting plug 56 having a central opening 57 therethrough, this central opening 57 permitting the ingress of air into the hub 9, from whence it may also pass upwardly through the friction discs to cool the same, while the plug 56 functions to add rigidity and support the weight of the wheel 18 on the bearing 17 which is mounted upon the secondary disc or plate 12, thus relieving the hub 9 of the load of the wheel.

While the specific details of the invention have been herein shown and described, changes and alterations may be resorted to without departing from the spirit thereof as defined in the appended claims.

I claim:

1. A fluid pressure-operated motor comprising a member having a piston chamber therein and also having a fluid inlet and outlet for establishing communication between a source of pressure fluid and said piston chamber, a piston reciprocably disposed in said piston chamber, one-way shiftable means cooperatively interengaged with said piston and with the member having the piston chamber for allowing unlimited movement of said piston outwardly of said piston chamber and limiting return inward movement of said piston, said one-way shiftable means including a screw, the member having the piston chamber being provided with a complemental screw-threaded opening in which said screw is threadedly mounted, said piston having an opening at its inner end, and said screw projecting into said latter piston opening into abutting contact with said piston to prevent inward movement of said piston, and said screw and piston having cooperative means for effecting rotation and consequent axial movement of said screw along with said piston upon outward movement of said piston.

2. A fluid pressure-operated motor comprising a member having a piston chamber therein and also having a fluid inlet and outlet for establishing communication between a source of pressure fluid and said piston chamber, a piston reciprocably disposed in said piston chamber, one-way shiftable means cooperatively interengaged with said piston and with the member having the piston chamber for allowing unlimited movement of said piston outwardly of said piston chamber and limiting return inward movement of said piston, said one-way shiftable means including a screw, the member having the piston chamber being provided with a complemental screw-threaded opening in which said screw is threadedly mounted, said piston having an opening at its inner end, and said screw projecting into said latter piston opening and having an enlarged head disposed in said opening in abutting contact with said piston to prevent inward movement of said piston, said piston having a thrust shoulder projecting into the opening therein behind said screw head, and anti-friction thrust transmitting means between said thrust shoulder and said screw head for imparting axial thrust to said screw head with consequent rotation of said screw for shifting said screw axially along with said piston upon outward movement of said piston.

3. A fluid pressure-operated motor comprising a member having a piston chamber therein and also having a fluid inlet and outlet for establishing communication between a source of pressure fluid and said piston chamber, a piston reciprocably disposed in said piston chamber, one-way shiftable means cooperatively interengaged with said piston and with the member having the piston chamber for allowing unlimited movement of said piston outwardly of said piston chamber and limiting return inward movement of said piston, said one-way shiftable means including a screw, the member having the piston chamber being provided with a complemental screw-threaded opening in which said screw is threadedly mounted, said piston having an opening at its inner end, and said screw projecting into said latter piston opening and having an enlarged head disposed in said opening in abutting contact with said piston to prevent inward movement of said piston, said piston having a thrust shoulder projecting into the opening therein behind said screw head, and anti-friction thrust transmitting means between said thrust shoulder and said screw head for imparting axial thrust to said screw head with consequent rotation of said screw for shifting said screw axially along with said piston upon outward movement of said piston, the thickness of said thrust transmitting means being slightly less than the distance between the screw head and the thrust shoulder aforesaid.

4. A fluid pressure-operated motor comprising a member having a piston chamber therein and also having a fluid inlet and outlet for establishing communication between a source of pressure fluid and said piston chamber, a piston reciprocably disposed in said piston chamber, one-way shiftable means cooperatively interengaged with said piston and with the member having the piston chamber for allowing unlimited movement of said piston outwardly of said piston chamber and limiting return inward movement of said piston, said one-way shiftable means including a screw, the member having the piston chamber being provided with a complemental screw-threaded opening in which said screw is threadedly mounted, said piston having an opening at its inner end, and said screw projecting into said latter piston opening into abutting contact with said piston to prevent inward movement of said piston, and said screw and piston having cooperative means for effecting rotation and consequent axial movement of said screw along with said piston upon outward movement of said piston, said screw and the opening in which the screw is mounted having complemental annular surfaces in close engagement with one another, one of said surfaces having an annular seat therein, and an annular seal disposed in said seat and closely engaged with the outer surface for sealing the piston chamber against leakage of pressure fluid past said screw.

5. A fluid pressure-operated motor comprising a member having a piston chamber therein and also having a fluid inlet and outlet for establishing communication between a source of pressure fluid and said piston chamber, a piston reciprocably disposed in said piston chamber, one-way shiftable means cooperatively interengaged with said piston and with the member having the piston chamber for allowing unlimited movement of said piston outwardly of said piston chamber and limiting return inward movement of said piston, said one-way shiftable means including a screw, the member having the piston chamber being provided with a complemental screw-threaded opening in which said screw is threadedly mounted, said piston having an opening at its inner end, and said screw projecting into said latter piston opening into abutting contact with said piston to prevent inward movement of said piston, and said screw and piston having cooperative means for effecting rotation and consequent axial movement of said screw along with said piston upon outward movement of said piston, and means for preventing overrunning of said screw comprising a resilient seal closely gripping said screw and closely fitting in the opening in which the screw is mounted for frictionally resisting rotation of said screw and for sealing the screw-mounting opening against leakage of pressure fluid from said piston chamber.

References Cited in the file of this patent

UNITED STATES PATENTS

| | | |
|---|---|---|
| 728,443 | Clark | May 19, 1903 |
| 2,106,167 | Colman | Jan. 25, 1938 |
| 2,563,759 | Tiscornia et al. | Aug. 7, 1951 |
| 2,568,858 | Kovac | Sept. 25, 1951 |
| 2,672,220 | Collier | Mar. 16, 1954 |
| 2,778,452 | Dasse | Jan. 22, 1957 |